US012249339B2

(12) United States Patent
Wang et al.

(10) Patent No.: US 12,249,339 B2
(45) Date of Patent: *Mar. 11, 2025

(54) SIGNAL PROCESSING METHOD AND DEVICE

(71) Applicant: Huawei Technologies Co., Ltd., Shenzhen (CN)

(72) Inventors: Bin Wang, Shenzhen (CN); Lei Miao, Beijing (CN); Zexin Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,381

(22) Filed: Dec. 13, 2023

(65) Prior Publication Data

US 2024/0185867 A1 Jun. 6, 2024

Related U.S. Application Data

(63) Continuation of application No. 18/157,518, filed on Jan. 20, 2023, now Pat. No. 11,881,226, which is a (Continued)

(30) Foreign Application Priority Data

Apr. 29, 2014 (CN) ........................ 201410177234.3

(51) Int. Cl.
*G10L 19/02* (2013.01)
*G10L 19/002* (2013.01)

(52) U.S. Cl.
CPC ........ *G10L 19/0204* (2013.01); *G10L 19/002* (2013.01); *G10L 19/02* (2013.01)

(58) Field of Classification Search
USPC .................................................. 704/500–504
See application file for complete search history.

(56) References Cited

U.S. PATENT DOCUMENTS 5,479,561 A 12/1995 Kim
5,983,172 A 11/1999 Takashima et al.
(Continued)

FOREIGN PATENT DOCUMENTS

CN 101727906 A 6/2010
CN 101770775 A 7/2010
(Continued)

OTHER PUBLICATIONS

Wang, G., et al., "A Novel Self-adaptive Bit Allocation Method Based on Energy Distribution of Scale Factor Bands in AAC," Journal of Wuhan University of Technology, vol. 33, No. 10, Oct. 2011, 4 pages, with English Translation.

(Continued)

*Primary Examiner* — Leonard Saint-Cyr
(74) *Attorney, Agent, or Firm* — Conley Rose, P.C.

(57) ABSTRACT

A signal processing method and device includes obtaining spectral coefficients of a current frame of an audio signal, in which N sub-bands of the current frame comprises at least one of the spectral coefficients. A total energy of M successive sub-bands of the N sub-bands, a total energy of K successive sub-bands of the N sub-bands, and an energy of a first sub-band are obtained to determine whether to modify original envelope values of the M sub-bands. When the original envelope values of the M sub-bands are modified, encoding bits are allocated to each of the N sub-bands according to the modified envelope values of the M sub-bands.

20 Claims, 3 Drawing Sheets

Related U.S. Application Data continuation of application No. 17/376,813, filed on Jul. 15, 2021, now Pat. No. 11,580,996, which is a continuation of application No. 16/725,678, filed on Dec. 23, 2019, now Pat. No. 11,081,121, which is a continuation of application No. 16/409,290, filed on May 10, 2019, now Pat. No. 10,546,591, which is a continuation of application No. 16/205,246, filed on Nov. 30, 2018, now Pat. No. 10,347,264, which is a continuation of application No. 15/686,175, filed on Aug. 25, 2017, now Pat. No. 10,186,271, which is a continuation of application No. 15/335,449, filed on Oct. 27, 2016, now Pat. No. 9,837,088, which is a continuation of application No. PCT/CN2014/092695, filed on Dec. 1, 2014.

(56) References Cited

U.S. PATENT DOCUMENTS

| | | | | |
|---|---|---|---|---|
| 8,352,279 | B2 | 1/2013 | Gao | |
| 8,392,198 | B1 | 3/2013 | Berisha et al. | |
| 8,498,874 | B2 | 7/2013 | Kishore | |
| 2006/0210180 | A1 | 9/2006 | Geiger et al. | |
| 2007/0016403 | A1 | 1/2007 | Schuller et al. | |
| 2007/0219785 | A1 | 9/2007 | Gao | |
| 2009/0287478 | A1 | 11/2009 | Gao | |
| 2010/0063810 | A1* | 3/2010 | Gao | G10L 19/032 370/352 |
| 2011/0035227 | A1 | 2/2011 | Lee et al. | |
| 2011/0251846 | A1 | 10/2011 | Liu et al. | |
| 2011/0301961 | A1 | 12/2011 | Lee et al. | |
| 2011/0320211 | A1 | 12/2011 | Liu et al. | |
| 2012/0016667 | A1 | 1/2012 | Gao | |
| 2012/0016668 | A1* | 1/2012 | Gao | G10L 21/038 704/E19.01 |
| 2012/0076323 | A1 | 3/2012 | Disch et al. | |
| 2012/0226505 | A1* | 9/2012 | Lin | H03M 7/3082 704/500 |
| 2012/0259644 | A1* | 10/2012 | Lin | H03M 7/4018 704/500 |
| 2012/0290305 | A1 | 11/2012 | Jinwei et al. | |
| 2012/0323584 | A1 | 12/2012 | Koishida et al. | |
| 2012/0328124 | A1 | 12/2012 | Kjoerling | |
| 2013/0275140 | A1 | 10/2013 | Kim et al. | |
| 2014/0156284 | A1* | 6/2014 | Porov | G10L 19/167 704/500 |
| 2015/0162011 | A1 | 6/2015 | Qi et al. | |
| 2015/0302860 | A1* | 10/2015 | Qi | G10L 19/002 704/500 |
| 2015/0317991 | A1* | 11/2015 | Liu | G10L 19/035 704/205 |
| 2016/0035364 | A1 | 2/2016 | Liu et al. | |
| 2016/0111104 | A1 | 4/2016 | Liu et al. | |
| 2017/0352358 | A1 | 12/2017 | Wang et al. | |

FOREIGN PATENT DOCUMENTS

| | | | |
|---|---|---|---|
| CN | 101853663 | A | 10/2010 |
| CN | 102436820 | A | 5/2012 |
| CN | 103366750 | A | 10/2013 |
| CN | 103544957 | A | 1/2014 |
| EP | 2717262 | A1 | 4/2014 |
| EP | 2863388 | A1 | 4/2015 |
| JP | H09153811 | A | 6/1997 |
| JP | 2003280698 | A | 10/2003 |
| JP | 2005258478 | A | 9/2005 |
| JP | 2008309955 | A | 12/2008 |
| JP | 2009288560 | A | 12/2009 |
| JP | 2013511054 | A | 3/2013 |
| JP | 2016527546 | A | 9/2016 |
| JP | 2017507366 | A | 3/2017 |
| RU | 2325708 | C2 | 5/2008 |
| RU | 2335809 | C2 | 10/2008 |
| RU | 2523173 | C2 | 7/2014 |
| WO | 2007041789 | A1 | 4/2007 |
| WO | 2014008786 | A1 | 1/2014 |

OTHER PUBLICATIONS

ISO/IEC FDIS 23003-3:2011(E) Information technology—MPEG audio technologies—Part 3: Unified speech and audio coding, ISO/IEC JTC 1/SC 29/WG 11, Sep. 20, 2011, 291 pages.

"Series G: Transmission Systems and Media, Digital Systems and Networks, Digital terminal equipments—Coding of analogue signals, Low-complexity, full-band audio coding for high-quality, conversational applications," ITU-T G.719, Jun. 2008, 58 pages.

"Draft new ITU-T Recommendation G.719 Low-complexity full-band audio coding for high-quality conversational applications (for Consent); TD 523 (PLEN/16)," ITU-T Draft; Study Period 2005-2008, International Telecommunication Union, vol. 10/16, May 15, 2008, 46 pages.

* cited by examiner

SIGNAL PROCESSING METHOD AND DEVICE

CROSS-REFERENCE TO RELATED APPLICATIONS

This application is a continuation of U.S. patent application Ser. No. 18/157,518, filed on Jan. 20, 2023, now U.S. Pat. No. 11,881,226, which is a continuation of U.S. patent application Ser. No. 17/376,813, filed on Jul. 15, 2021, now U.S. Pat. No. 11,580,996, which is a continuation of U.S. patent application Ser. No. 16/725,678, filed on Dec. 23, 2019, now U.S. Pat. No. 11,081,121, which is a continuation of U.S. patent application Ser. No. 16/409,290, filed on May 10, 2019, now U.S. Pat. No. 10,546,591, which is a continuation of U.S. patent application Ser. No. 16/205,246, filed on Nov. 30, 2018, now U.S. Pat. No. 10,347,264, which is a continuation of U.S. patent application Ser. No. 15/686,175, filed on Aug. 25, 2017, now U.S. Pat. No. 10,186,271, which is a continuation of U.S. Patent Application Ser. No. 15/335,449, filed on Oct. 27, 2016, now U.S. Pat. No. 9,837,088, which is a continuation of International Patent Application No. PCT/CN2014/092695, filed on Dec. 1, 2014, which claims priority to Chinese Patent Application No. 201410177234.3, filed on Apr. 29, 2014. All of the aforementioned patent applications are hereby incorporated by reference in their entireties.

TECHNICAL FIELD

The present disclosure relates to the signal processing field, and specifically, to a signal processing method and device.

BACKGROUND

In current communication transmission, increasing attention is paid to quality of voice signals or audio signals. Therefore, quality requirements for signal encoding and decoding are increasingly high. In existing frequency domain encoding algorithms, bit allocation is generally performed on each sub-band of a signal directly according to a size of a frequency envelope, and then each sub-band is encoded using a quantity of allocated bits. However, practice shows that, in these existing encoding algorithms, sub-bands of a low frequency band have relatively large impact on signal encoding quality. Therefore, the sub-bands of the low frequency band generally become a bottleneck of signal encoding performance. The foregoing bit allocation manner cannot well adapt to a bit requirement of each sub-band, especially that of a sub-band of a low frequency band, which leads to relatively poor signal encoding performance. Correspondingly, signal decoding performance is also relatively poor.

SUMMARY

Embodiments of the present disclosure provide a signal processing method and device, which can improve signal encoding and decoding performance.

According to a first aspect, a signal processing method is provided. The method includes selecting M sub-bands from N sub-bands, where the N sub-bands are obtained by dividing spectral coefficients of a current frame of a signal, a frequency band of each of the M sub-bands is lower than a frequency band of each of the non-selected K sub-bands, N is a positive integer greater than 1, both M and K are positive integers, and the sum of M and K is N, determining, according to performance information of the M sub-bands, whether to modify original envelope values of the M sub-bands, where the performance information includes an energy attribute and a spectral attribute of the M sub-bands, modify the original envelope values of the M sub-bands individually to obtain modified envelope values of the M sub-bands, and performing a first bit allocation on the N sub-bands according to the modified envelope values of the M sub-bands and original envelope values of the K sub-bands.

With reference to the first aspect, in a first possible implementation manner, the determining, according to performance information of the M sub-bands, to modify original envelope values of the M sub-bands includes determining a first parameter according to original envelope values of the N sub-bands, where the first parameter indicates a concentration degrec that is of spectral energy of the signal and that is on the M sub-bands, determining a second parameter according to the original envelope values of the M sub-bands, where the second parameter indicates a degree of spectral fluctuation of the M sub-bands, and determining, if the first parameter falls within a first range and the second parameter falls within a second range, to modify the original envelope values of the M sub-bands.

With reference to the first possible implementation manner of the first aspect, in a second possible implementation manner, the determining a first parameter according to original envelope values of the N sub-bands includes determining total energy of the M sub-bands according to the original envelope values of the M sub-bands, determining total energy of the K sub-bands according to the original envelope values of the K sub-bands, and determining a ratio of the total energy of the M sub-bands to the total energy of the K sub-bands as the first parameter.

With reference to the first possible implementation manner or the second possible implementation manner of the first aspect, in a third possible implementation manner, the determining a second parameter according to the original envelope values of the M sub-bands includes determining the total energy of the M sub-bands and energy of a first sub-band according to the original envelope values of the M sub-bands, where the energy of the first sub-band is the largest in that of the M sub-bands, and determining a ratio of the energy of the first sub-band to the total energy of the M sub-bands as the second parameter.

With reference to the first aspect or any one of the foregoing implementation manners, in a fourth possible implementation manner, the modifying separately on the original envelope values of the M sub-bands to obtain modified envelope values of the M sub-bands includes determining the total energy of the M sub-bands and the energy of the first sub-band according to the original envelope values of the M sub-bands, where the energy of the first sub-band is the largest in that of the M sub-bands, determining a modification factor according to the total energy of the M sub-bands and the energy of the first sub-band, and modifying separately on the original envelope values of the M sub-bands using the modification factor to obtain the modified envelope values of the M sub-bands.

With reference to the first aspect or any one of the foregoing implementation manners, in a fifth possible implementation manner, a modified envelope value of each sub-band in the M sub-bands is greater than an original envelope value of the same sub-band.

With reference to the first aspect or any one of the foregoing implementation manners, in a sixth possible implementation manner, the method further includes determining a quantity of redundant bits of each sub-band in the N sub-bands according to quantities of bits respectively allocated to the N sub-bands during the first bit allocation, where the quantity of redundant bits of each sub-band in the N sub-bands is less than a quantity of bits required for encoding a single information unit in the same sub-band, determining a total quantity of redundant bits according to the quantity of redundant bits of each sub-band in the N sub-bands, and performing a second bit allocation on the N sub-bands according to the modified envelope values of the M sub-bands, the original envelope values of the K sub-bands, and the total quantity of redundant bits.

According to a second aspect, a signal processing device is provided, including a selection unit, configured to select M sub-bands from N sub-bands, where the N sub-bands are obtained by dividing spectral coefficients of a current frame of a signal, a frequency band of the M sub-bands is lower than a frequency band of K sub-bands in the N sub-bands except the M sub-bands, N is a positive integer greater than 1, both M and K are positive integers, and the sum of M and K is N, a determining unit, configured to determine, according to performance information of the M sub-bands, to modify original envelope values of the M sub-bands, where the performance information is used to indicate an energy attribute and a spectral attribute of the M sub-bands, a modification unit, configured to perform modification separately on the original envelope values of the M sub-bands to obtain modified envelope values of the M sub-bands, and an allocation unit, configured to perform first bit allocation on the N sub-bands according to the modified envelope values of the M sub-bands and original envelope values of the K sub-bands.

With reference to the second aspect, in a first possible implementation manner, the determining unit is configured to determine a first parameter according to original envelope values of the N sub-bands, where the first parameter indicates a concentration degree that is of spectral energy of the signal and that is on the M sub-bands, determine a second parameter according to the original envelope values of the M sub-bands, where the second parameter indicates a degree of spectral fluctuation of the M sub-bands, and determine, if the first parameter falls within a first range and the second parameter falls within a second range, to modify the original envelope values of the M sub-bands.

With reference to the first possible implementation manner of the second aspect, in a second possible implementation manner, the determining unit is configured to determine total energy of the M sub-bands according to the original envelope values of the M sub-bands, determine total energy of the K sub-bands according to the original envelope values of the K sub-bands, and determine a ratio of the total energy of the M sub-bands to the total energy of the K sub-bands as the first parameter.

With reference to the first possible implementation manner or the second possible implementation manner of the second aspect, in a third possible implementation manner, the determining unit is configured to determine the total energy of the M sub-bands and energy of a first sub-band according to the original envelope values of the M sub-bands, where the energy of the first sub-band is the largest in that of the M sub-bands, and determine a ratio of the energy of the first sub-band to the total energy of the M sub-bands as the second parameter.

With reference to the second aspect or any one of the foregoing implementation manners, in a fourth possible implementation manner, the modification unit is configured to determine the total energy of the M sub-bands and the energy of the first sub-band according to the original envelope values of the M sub-bands, where the energy of the first sub-band is the largest in that of the M sub-bands, determine a modification factor according to the total energy of the M sub-bands and the energy of the first sub-band, and perform modification separately on the original envelope values of the M sub-bands using the modification factor to obtain the modified envelope values of the M sub-bands.

With reference to the second aspect or any one of the foregoing implementation manners, in a fifth possible implementation manner, a modified envelope value of each sub-band in the M sub-bands is greater than an original envelope value of the same sub-band.

With reference to the second aspect or any one of the foregoing implementation manners, in a sixth possible implementation manner, the determining unit is further configured to determine a quantity of redundant bits of each sub-band in the N sub-bands according to quantities of bits respectively allocated to the N sub-bands during the first bit allocation, where the quantity of redundant bits of each sub-band in the N sub-bands is less than a quantity of bits required for encoding a single information unit in the same sub-band, the determining unit is further configured to determine a total quantity of redundant bits according to the quantity of redundant bits of each sub-band in the N sub-bands, and the allocation unit is further configured to perform second bit allocation on the N sub-bands according to the modified envelope values of the M sub-bands, the original envelope values of the K sub-bands, and the total quantity of redundant bits.

In the embodiments of the present disclosure, bit allocation is not directly performed according to original envelope values of N sub-bands, instead, M sub-bands of a low frequency band are selected from the N sub-bands, it is determined, according to an energy attribute and a spectral attribute of the M sub-bands, to modify original envelope values of the M sub-bands, modification is performed separately on the original envelope values of the M sub-bands according to the original envelope values of the M sub-bands, and first bit allocation is performed on the N sub-bands according to modified envelope values of the M sub-bands and original envelope values of K sub-bands such that bit allocation better meets a bit requirement of each sub-band, and therefore, signal encoding and decoding performance can be improved.

BRIEF DESCRIPTION OF DRAWINGS

The following briefly describes the accompanying drawings used in describing the embodiments of the present disclosure. The accompanying drawings in the following description show merely some embodiments of the present disclosure, and persons of ordinary skill in the art may still derive other embodiments from these accompanying drawings without creative efforts.

DESCRIPTION OF EMBODIMENTS

The following describes the technical solutions in the embodiments of the present disclosure with reference to the accompanying drawings.

Signal encoding technology and signal decoding technology are widely used in various electronic devices, such as mobile phones, wireless apparatuses, personal data assistants (PDAs), handheld or portable computers, Global Positioning System (GPS) receivers or navigation devices, cameras, audio/video players, video cameras, video recorders, and monitoring devices. Generally, one such electronic device may include a voice or audio encoder, and may further include a voice or audio decoder. The voice or audio encoder and the voice or audio decoder may be directly implemented by a digital circuit or a chip, such as a digital signal processor (DSP) chip, or may be implemented by a software code-driven processor by executing a procedure in software code.

Figure 1:
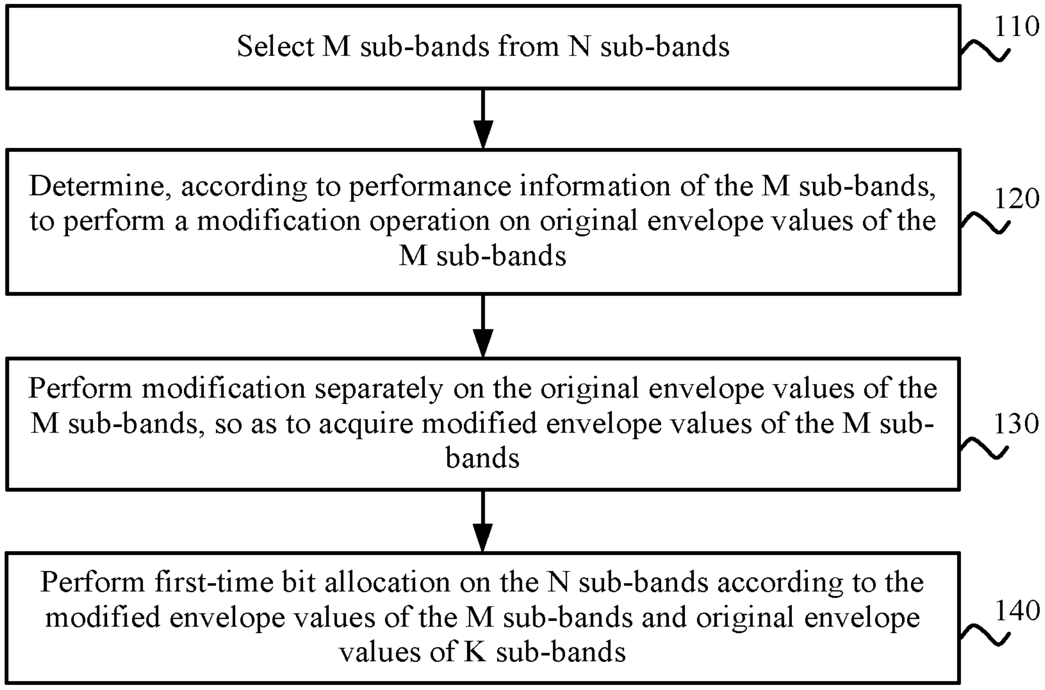
FIG. 1 is a flowchart of a signal processing method according to an embodiment of the present disclosure.

FIG. 1 is a flowchart of a signal processing method according to an embodiment of the present disclosure. The method is executed by an encoder side, such as the foregoing voice or audio encoder. The method may also be executed by a decoder side, such as the foregoing voice or audio decoder.

In an encoding process, an encoder side may first transform a time-domain signal into a frequency-domain signal. For example, time-frequency transformation may be performed using an algorithm such as fast Fourier transform (FFT) or modified discrete cosine transform (MDCT). Then, spectral coefficients of the frequency-domain signal are normalized using a global gain, and normalized spectral coefficients are divided to obtain multiple sub-bands.

In a decoding process, the decoder side may decode a bitstream received from the encoder side to obtain normalized spectral coefficients, and the normalized spectral coefficients are divided to obtain multiple sub-bands. The method of FIG. 1 includes the following steps.

110. Dividing spectral coefficients of a current frame of a signal into N sub-bands, and select M sub-bands from the N sub-bands, where N=M+K. The M sub-bands are lower in frequencies than the frequencies of the non-selected K sub-bands. N is a positive integer greater than 1, and both M and K are positive integers.

In this embodiment of the present disclosure, the signal may be a voice signal, or may be an audio signal.

120. Determine, according to performance information of the M sub-bands, to modify original envelope values of the M sub-bands, where the performance information indicates an energy attribute and a spectral attribute of the M sub-bands.

130. Modify the original envelope values of the M sub-bands respectively, to obtain modified envelope values of the M sub-bands.

140. Perform a first bit allocation on the N sub-bands according to the modified envelope values of the M sub-bands and original envelope values of the K sub-bands.

In this embodiment of the present disclosure, bit allocation is not directly performed according to original envelope values of N sub-bands. Instead, M low frequency sub-bands are selected from the N sub-bands. It is determined, according to an energy attribute and a spectral attribute of the M sub-bands, to modify original envelope values of the M sub-bands. The original envelope values of the M sub-bands are modified respectively, and a first bit allocation is performed on the N sub-bands according to modified envelope values of the M sub-bands and original envelope values of K sub-bands such that the bit allocation better meets bit requirements of the sub-bands, and therefore, signal encoding and decoding performance can be improved.

In an existing frequency domain encoding algorithm, bit allocation is performed on each sub-band of a signal directly according to size of the frequency envelope of the sub-band. As a result, quantity of allocated bits cannot well meet bit requirements of some low frequency sub-bands. However, in this embodiment of the present disclosure, the M low frequency sub-bands are first selected from the N sub-bands of the current frame of the signal. It is determined, according to the energy attribute and the spectral attribute of the M sub-bands, to modify the original envelope values of the M sub-bands. Modification is performed on the original envelope values of the M sub-bands according to the original envelope values of the M sub-bands, and then the first bit allocation is performed on the N sub-bands according to the modified envelope values of the M sub-bands and the original envelope values of the K sub-bands. It may be learned that, in this embodiment of the present disclosure, bit allocation is not directly performed on the N sub-bands according to the original envelope values of the N sub-bands. Instead, the energy attribute and the spectral attribute of the M sub-bands are used as considerations to determine that modification needs to be performed on the M sub-bands to obtain the respective modified envelope values of the M sub-bands. The bit allocation is performed according to the modified envelope values of the low frequency sub-bands and original envelope values of the other sub-bands such that the bit allocation on each sub-band is more proper, especially for the M low frequency sub-bands, and therefore, signal encoding and decoding performance can be improved.

After the spectral coefficients are divided to obtain the N sub-bands, an envelope of each sub-band may be calculated and quantized. Therefore, each sub-band has a quantized envelope value. It should be understood that an original envelope value is relative to a modified envelope value, and the original envelope value may refer to an initial envelope value of a sub-band, that is, a quantized envelope value obtained by calculation after sub-band division. An envelope value obtained after modifying the initial envelope value of the sub-band is referred to as the modified envelope value. Therefore, in this embodiment of the present disclosure, both the original envelope value and modified envelope value refer to quantized envelope values.

Optionally, in step 110, the M sub-bands may be selected from the N sub-bands according to a harmonic attribute of the sub-bands and energies of the sub-bands. For example, harmonic strength of each sub-band of the M sub-bands may be greater than a preset strength threshold, and a ratio of energy of the sub-band to total energy of the N sub-bands is greater than a preset energy threshold. As mentioned above, low frequency sub-bands are generally a bottleneck of signal encoding performance. In these sub-bands, a sub-band that has a relatively strong harmonic attribute with energy that accounts for a specific proportion of total energy of all sub-bands is particularly a bottleneck of the encoding performance. Therefore, after the M sub-bands are selected from the N sub-bands according to the harmonic attribute of the sub-bands and the energy of the sub-bands, and the original envelope values of the M sub-bands are modified, bit allocation on the M sub-bands is more proper, and therefore, signal encoding and decoding performance can be more effectively improved.

Optionally, as another embodiment, the frequencies of the N sub-bands may be arranged in ascending order. In this way, in step 110, the first M sub-bands may be selected from the N sub-bands. In this embodiment, the M sub-bands are selected in ascending order of frequency bands, which can simplify an operation and improve signal processing efficiency.

Optionally, as another embodiment, in step 120, a first parameter may be determined according to the original envelope values of the N sub-bands, where the first parameter indicates a concentration degree of signal spectral energy on the M sub-bands. A second parameter may be determined according to the original envelope values of the M sub-bands, where the second parameter indicates a degree of spectral fluctuation of the M sub-bands. If the first parameter falls within a first range and the second parameter falls within a second range, it may be determined that the original envelope values of the M sub-bands should be modified.

In an embodiment, the energy attribute of the M sub-bands may be the concentration degree of the signal spectral energy on the M sub-bands, and the spectral attribute of the M sub-bands may be the degree of spectral fluctuation of the M sub-bands.

The first range is related to energy of a sub-band, and may be preset. When the concentration degree of the signal spectral energy on the M sub-bands is relatively low, i.e. lower than the low point of the range, it may indicate that a ratio of the M sub-bands to the N sub-bands is small, and the encoding performance is not greatly affected. Therefore, there is no need to modify the original envelope values of the M sub-bands. When the concentration degree of the signal spectral energy on the M sub-bands is relatively high, i.e. higher than the high point of the range, it indicates that the original envelope values of the M sub-bands are also relatively large. Therefore, a quantity of bits allocated to the M sub-bands is enough for encoding, and there is also no need to modify the original envelope values of the M sub-bands. The first range may be predetermined by means of experimental simulation. For example, the first range may be preset to [1/6, 2/3].

The second range is related to a degree of spectral fluctuation of sub-bands, and may be preset. If the degree of spectral fluctuation of the M sub-bands is lower that the low point of the range, the encoding performance is not greatly affected even if the quantity of bits allocated to the M sub-band is small. In this way, there is no need to modify the original envelope values of the M sub-bands. In this case, being in the second range indicates that the degree of spectral fluctuation of the sub-bands is relatively high. The second range may be predetermined by means of experimental simulation. For example, the second range may be preset to $$\left[\frac{1}{0.575*M},\infty\right)$$

or $$\left[\frac{1}{0.5*M},\infty\right).$$

Generally, if in a signal, bandwidth that can be used for encoding is 0 to 4 Kilohertz (KHz), the second range may be preset to $$\left[\frac{1}{0.575*M},\infty\right).$$

if in a signal, bandwidth that can be used for encoding is 0 to 8 KHz, the second range may be preset to $$\left[\frac{1}{0.5*M},\infty\right).$$

When the first parameter falls within the first range and the second parameter falls within the second range, it means that the concentration degree of the signal spectral energy on the M sub-bands is neither extremely high nor extremely low, and the degree of spectral fluctuation of the M sub-bands is relatively high. The original envelope values of the M sub-bands may be modified such that bits allocated to the M sub-bands during the first bit allocation of the M sub-bands better meet the bit requirements of the M sub-bands. For example, for each sub-band in the M sub-bands, a modified envelope value is greater than an original envelope value. Then, compared with performing first bit allocation according to the original envelope values of the M sub-bands, performing the first bit allocation according to the modified envelope values of the M sub-bands makes a quantity of bits allocated to the M sub-bands larger, and therefore, encoding performance of the M sub-bands can be improved.

It may be learned that, in this embodiment, the first parameter and the second parameter that are determined according to the original envelope values of the N sub-bands may reflect an attribute of each frequency band. In this embodiment, if the first parameter falls within the first range and the second parameter falls within the second range, it is determined to modify the original envelope values of the M sub-bands. When bit allocation is subsequently performed according to the modified envelope values of the M sub-bands, quantity of bits allocated to the M sub-bands better meets bit requirements of the M sub-bands, and therefore, signal encoding and decoding performance can be improved.

Optionally, as another embodiment, in step 120, total energy of the M sub-bands may be determined according to the original envelope values of the M sub-bands. Total energy of the K sub-bands may be determined according to the original envelope values of the K sub-bands. A ratio of the total energy of the M sub-bands to the total energy of the K sub-bands may be determined as the first parameter.

In an embodiment, the ratio of the total energy of the M sub-bands to the total energy of the K sub-bands may be determined as the first parameter.

For example, the first parameter may be obtained by calculation according to the following equations, where the first parameter may be represented by α

$$\alpha=\frac{E_{P_M}}{E_{P_K}},$$

-continued $$E_{P_M}=\sum_{i=0}^{M-1}E_{P\_tmp_i},\ E_{P_K}=\sum_{i=M}^{N-M-1}E_{P\_tmp_i},$$

$$E_{P\_tmp_i}=\sqrt{\frac{E_{P_i}}{\text{band\_width}_i}},\ \text{and}\ E_{P_i}=2^{band\_energy_i},$$

$E_{P_M}$ represents the total energy of the M sub-bands, $E_{P_K}$ represents the total energy of the K sub-bands, $\text{band\_width}_i$ represents bandwidth of the $i^{th}$ sub-band, and $\text{band\_energy}_i$ represents energy of the $i^{th}$ sub-band. $\text{band\_energy}_i$ may also represent an original envelope value of the $i^{th}$ sub-band. For example, the original envelope value $\text{band\_energy}_i$ of the $i^{th}$ sub-band may be obtained according to spectral coefficients of the $i^{th}$ sub-band. For example, $\text{band\_energy}_i$ may be obtained according to the following equations $$\text{band\_energy}_i=\log_2 E_i,\ \text{and}$$

$$E_i=\sum_{i=1}^{band\_width_i}\text{t\_audio}[j]*\text{t\_audio}[j].$$

In some embodiments, modifications or changes may be made according to the foregoing equations, to obtain the first parameter, and such modifications or changes also fall within a scope of this embodiment of the present disclosure.

Optionally, as another embodiment, in step 120, according to the original envelope values of the M sub-bands, total energy of the M sub-bands may be determined, and energy of a first sub-band may be determined, where the energy of the first sub-band is the largest in that of the M sub-bands. A ratio of the energy of the first sub-band to the total energy of the M sub-bands may be determined as the second parameter.

In an embodiment, the degree of spectral fluctuation of the M sub-bands may be indicated using a fluctuation degree of the original envelope values of the M sub-bands. For example, the second parameter may be obtained by calculation according to the following equations, where the second parameter may be represented by β

$$\beta=\frac{E_{P\_peak}}{E_{P_M}},\ \text{and}$$

$$E_{P\_peak}=\max\left(E_{p\_tem_0},E_{p\_tmp_1},\ldots,E_{p\_tmp_M}\right)$$

where, for calculation manners of $E_{P\_tmp_i}$ and $E_{P_M}$, reference may be made to the foregoing equations.

It should be understood that various equivalent modifications or changes may be made according to the foregoing equations, to obtain the second parameter, and such modifications or changes also fall within a scope of this embodiment of the present disclosure.

Optionally, as another embodiment, in step 130, total energy of the M sub-bands and energy of a first sub-band may be determined according to the original envelope values of the M sub-bands. The energy of the first sub-band is the largest in that of the M sub-bands. A modification factor may be determined according to the total energy of the M sub-bands and the energy of the first sub-band. Then, modification may be performed separately on the original envelope values of the M sub-bands using the modification factor to obtain the modified envelope values of the M sub-bands.

For example, the modification factor may be determined according to the following equations, where the modification factor may be represented by γ

$$\gamma=\min\left(1.2,\ \gamma_0^*\frac{E_{P\_peak}*M}{E_{P_M}}\right),$$

and $\gamma_0=0.575$ where, for calculation manners of $E_{P\_tmp_i}$ and $E_{P_M}$, reference may be made to the foregoing equations.

Modification may be performed on an original envelope value of each sub-band in the M sub-bands according to the modification factor γ. For example, the original envelope value of each sub-band may be multiplied by the modification factor to obtain a modified envelope value of the sub-band.

It should be understood that various equivalent modifications or changes may be made according to the foregoing equations, to obtain the modification factor, and such modifications or changes also fall within a scope of this embodiment of the present disclosure.

Optionally, as another embodiment, in step 130, a modified envelope value of each sub-band in the M sub-bands may be greater than an original envelope value of the sub-band.

In an embodiment, the modified envelope value of each sub-band in the M sub-bands is obtained by modifying the original envelope value of each sub-band in the M sub-bands. The modified envelope value of each sub-band may be greater than the original envelope value of the sub-band. If the modified envelope value of each sub-band in the M sub-bands is greater than the original envelope value of the sub-band. In step 140, bit allocation is performed according to the modified envelope values of the M sub-bands. In this way, a quantity of bits allocated to each sub-band in the M sub-bands increases such that the bit allocation better meets a bit requirement of each sub-band, and therefore, signal encoding and decoding performance can be improved.

Optionally, as another embodiment, in step 130, a modified envelope value of each sub-band in the M sub-bands may be less than an original envelope value of the sub-band.

In an embodiment, if the modified envelope value of each sub-band in the M sub-bands is less than the original envelope value of the sub-band, in step 140, bit allocation is performed according to the modified envelope values of the M sub-bands and original envelope values of the K sub-bands. In this way, a quantity of bits allocated to each sub-band in the M sub-bands is relatively small, and accordingly, quantities of bits respectively allocated to the K sub-bands increase such that the bit allocation better meets a bit requirement of each sub-band, and therefore, signal encoding and decoding performance can be improved.

Optionally, as another embodiment, in step 130, a first bit allocation may be performed on the N sub-bands in descending order of envelope values.

Optionally, as another embodiment, in step 130, a modification factor may be determined according to the second parameter. Then, modification may be performed separately on the original envelope values of the M sub-bands using the modification factor to obtain the modified envelope values of the M sub-bands.

In an embodiment, the modification factor may be determined according to the second parameter. Modification may be performed on an original envelope value of each sub-band in the M sub-bands according to the modification factor. For example, the original envelope value of each sub-band may be multiplied by the modification factor to obtain a modified envelope value of the sub-band such that a quantity of bits allocated to the M sub-bands better meets bit requirements of the M sub-bands, and therefore, signal encoding and decoding performance can be improved.

After the first bit allocation is performed, there are redundant bits in bits allocated to each sub-band. Redundant bits of each sub-band are not enough for encoding one information unit of the sub-band. Quantities of redundant bits of all sub-bands may be counted to obtain a total quantity of redundant bits, and then, a second bit allocation is performed.

Optionally, as another embodiment, after step 140, a quantity of redundant bits of each sub-band in the N sub-bands may be determined according to quantities of bits respectively allocated to the N sub-bands during the first bit allocation. The quantity of redundant bits of each sub-band in the N sub-bands is less than a quantity of bits required for encoding in the same sub-band. A total quantity of redundant bits may be determined according to the quantity of redundant bits of each sub-band in the N sub-bands. Then, second bit allocation may be performed on the N sub-bands according to the total quantity of redundant bits.

In an embodiment, total redundant bits may be equally allocated to the N sub-bands. In this way, redundant bits may be reused to avoid a waste of bits and further improve signal encoding and decoding performance.

The foregoing describes a process of a first bit allocation and a second bit allocation. If the foregoing method in FIG. 1 is executed by an encoder side, after the second bit allocation, the encoder side may quantize spectral coefficients of each sub-band using a quantity of bits allocated to each sub-band in the two bit allocations, write an index of quantized spectral coefficients and an index of original envelope values of sub-bands into a bitstream, and then send the bitstream to a decoder side.

If the foregoing method in FIG. 1 is executed by a decoder side, after the second bit allocation, the decoder side may decode a quantized spectral coefficient using a quantity of bits allocated to each sub-band in the two bit allocations to obtain a recovered signal.

The following describes embodiments of the present disclosure in detail with reference to specific examples. It should be understood that, these examples are merely intended to help persons skilled in the art better understand the embodiments of the present disclosure, but are not intended to limit the scope of the embodiments of the present disclosure.

In the following examples, an encoder side is used as an example for description.

Figure 2:
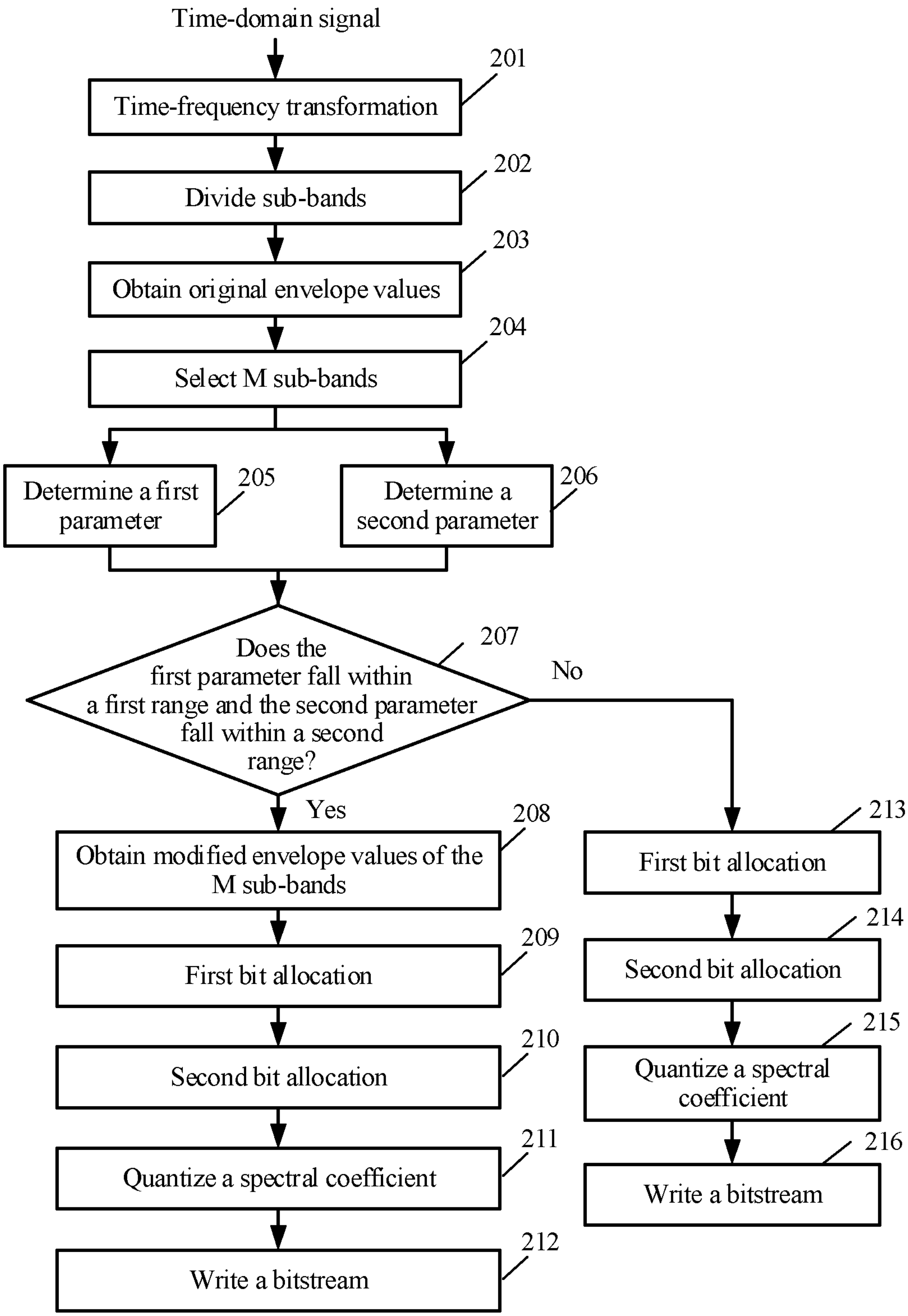
FIG. 2 is a flowchart of a process of a signal processing method according to an embodiment of the present disclosure.

FIG. 2 is a schematic flowchart of a process of a signal processing method according to an embodiment of the present disclosure. The signal processing method shown in FIG. 2 includes the following steps.

201. An encoder side performs time-frequency transformation on a time-domain signal.

202. The encoder side divides spectral coefficients of a frequency-domain signal into N sub-bands, where N is a positive integer greater than 1.

In an embodiment, the encoder side may calculate a global gain, the global gain is used to perform normalization on original spectral coefficients, then, the normalized spectral coefficients are divided to obtain all sub-bands.

203. The encoder side obtains an original envelope value of each sub-band by means of calculation and quantization.

204. The encoder side selects M sub-bands from the N sub-bands, where Mis a positive integer, and remaining K sub-bands are non-selected.

A frequency band of the M sub-bands is lower than a frequency band of K sub-bands, where K is a positive integer, and the sum of K and M is N.

205. The encoder side determines a first parameter according to original envelope values of the M sub-bands and original envelope values of K sub-bands.

The first parameter may indicate a concentration degree that is of spectral energy of the signal and that is on the M sub-bands. For example, a ratio of total energy of the M sub-bands to total energy of the K sub-bands may be used to indicate the first parameter. For a calculation manner of the first parameter, reference may be made to the calculation manner of the first parameter in the embodiment of FIG. 1, and details are not described again.

206. The encoder side determines a second parameter according to the original envelope values of the M sub-bands.

The second parameter may indicate a degree of spectral fluctuation of the M sub-bands. For example, a ratio of energy of a first sub-band to the total energy of the M sub-bands may be used to indicate the second parameter, where the energy of the first sub-band is the largest in that of the M sub-bands. For a calculation manner of the second parameter, reference may be made to the calculation manner of the second parameter in the embodiment of FIG. 1, and details are not described again.

207. The encoder side determines whether the first parameter falls within a first range and the second parameter falls within a second range.

The first range and the second range may be preset. For example, the first range may be preset to [1/6, 2/3]. The second range may be preset to $$\left[\frac{1}{0.575*M}, \infty\right)$$

or $$\left[\frac{1}{0.5*M}, \infty\right).$$

208. If the encoder side determines that the first parameter falls within the first range and the second parameter falls within the second range in step 207, modify the original envelope values of the M sub-bands according to the original envelope values of the M sub-bands to obtain modified envelope values of the M sub-bands.

In an embodiment, the encoder side may determine a modification factor according to the original envelope values of the M sub-bands. For a calculation manner of the modification factor, reference may be made to the process in the embodiment of FIG. 1, and details are not described again. The encoder side may perform modification on an original envelope value of each sub-band in the M sub-bands using the modification factor to obtain the modified envelope values of the M sub-bands. For example, a modified envelope value of each sub-band may be greater than the original envelope value of the sub-band.

209. The encoder side performs first bit allocation on the N sub-bands according to the modified envelope values of the M sub-bands and the original envelope values of the K sub-bands.

For example, the encoder side may perform first bit allocation on the N sub-bands in descending order of envelope values. For the M sub-bands, because the modified envelope value of each sub-band is greater than the original envelope value of the sub-band, compared with a quantity of allocated bits before modification, a quantity of bits allocated to each sub-band in the M sub-bands increases such that bit allocation better meets a bit requirement of each sub-band, thereby improving signal encoding and decoding performance.

210. The encoder side performs second bit allocation on the N sub-bands.

In an embodiment, the encoder side may determine a quantity of redundant bits of each sub-band according to a quantity of bits allocated to each sub-band in the N sub-bands after the first bit allocation and bandwidth of each sub-band to determine a total quantity of redundant bits of the N sub-bands. Then, total redundant bits are equally allocated to the N sub-bands according to the total quantity of redundant bits.

211. The encoder side quantizes spectral coefficients of each sub-band according to a quantity of bits allocated to each sub-band in the N sub-bands.

212. The encoder side writes a bitstream according to a quantized spectral coefficient obtained in step 211 and an original envelope value of each sub-band.

In an embodiment, the encoder side may write indexes of the quantized spectral coefficient, the original envelope value of each sub-band, and the like into the bitstream.

213. If the encoder side determines that the first parameter falls outside the first range or the second parameter falls outside the second range in step 207, the encoder side performs a first bit allocation on the N sub-bands according to original envelope values of the N sub-bands.

For example, the encoder side may perform first bit allocation on the N sub-bands in descending order of envelope values.

214. The encoder side performs a second bit allocation on the N sub-bands.

In an embodiment, the encoder side may determine a quantity of redundant bits of each sub-band according to a quantity of bits allocated to each sub-band in the N sub-bands after the first bit allocation and bandwidth of each sub-band to determine a total quantity of redundant bits of the N sub-bands. Then, total redundant bits are equally allocated to the N sub-bands according to the total quantity of redundant bits.

215. The encoder side quantizes spectral coefficients of each sub-band according to a quantity of bits allocated to each sub-band in the N sub-bands.

216. The encoder side writes a bitstream according to a quantized spectral coefficient obtained in step 215 and an original envelope value of each sub-band.

In an embodiment, the encoder side may write indexes of the quantized spectral coefficient, the original envelope value of each sub-band, and the like into the bitstream.

In this embodiment of the present disclosure, if a first parameter falls within a first range and a second parameter falls within a second range, modification is performed on original envelope values of M sub-bands of a low frequency band according to the original envelope values of the M sub-bands, and first bit allocation is performed on N sub-bands according to modified envelope values of the M sub-bands and original envelope values of K sub-bands such that bit allocation better meets a bit requirement of each sub-band, and therefore, signal encoding and decoding performance can be improved.

Figure 3:
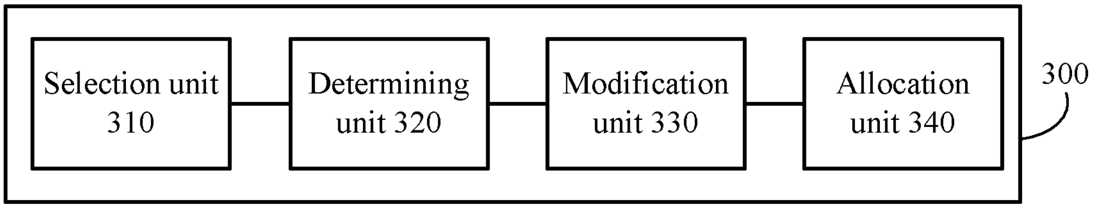
FIG. 3 is a functional block diagram of a signal processing device according to an embodiment of the present disclosure.

FIG. 3 is a schematic block diagram of a signal processing device according to an embodiment of the present disclosure. A device 300 in FIG. 3 may be an encoder side device or a decoder side device. The device 300 in FIG. 3 includes a selection unit 310, a determining unit 320, a modification unit 330, and an allocation unit 340.

The selection unit 310 selects M sub-bands from N sub-bands. The N sub-bands are obtained by dividing spectral coefficients of a current frame of a signal. A frequency band of the selected M sub-bands is lower than a frequency band of non-selected K sub-bands in the N sub-bands. N is a positive integer greater than 1, both M and K are positive integers, and the sum of M and K is N. The determining unit 320 determines, according to performance information of the M sub-bands, to modify original envelope values of the M sub-bands, where the performance information is used to indicate an energy attribute and a spectral attribute of the M sub-bands. The modification unit 330 performs modification separately on the original envelope values of the M sub-bands to obtain modified envelope values of the M sub-bands. The allocation unit 340 performs first bit allocation on the N sub-bands according to the modified envelope values of the M sub-bands and original envelope values of the K sub-bands.

In this embodiment of the present disclosure, bit allocation is not directly performed according to original envelope values of N sub-bands. Instead, M sub-bands of a low frequency band are selected from the N sub-bands, it is determined, according to an energy attribute and a spectral attribute of the M sub-bands, to modify original envelope values of the M sub-bands, modification is performed separately on the original envelope values of the M sub-bands according to the original envelope values of the M sub-bands, and first bit allocation is performed on the N sub-bands according to modified envelope values of the M sub-bands and original envelope values of K sub-bands such that bit allocation better meets a bit requirement of each sub-band, and therefore, signal encoding and decoding performance can be improved.

Optionally, as an embodiment, the determining unit 320 may determine a first parameter according to original envelope values of the N sub-bands, where the first parameter indicates a concentration degree that is of spectral energy of the signal and that is on the M sub-bands. The determining unit 320 may determine a second parameter according to the original envelope values of the M sub-bands, where the second parameter indicates a degree of spectral fluctuation of the M sub-bands. The determining unit 320 may determine, if the first parameter falls within a first range and the second parameter falls within a second range, to modify the original envelope values of the M sub-bands.

Optionally, as another embodiment, the determining unit 320 may determine total energy of the M sub-bands according to the original envelope values of the M sub-bands. The determining unit 320 may determine total energy of the K sub-bands according to the original envelope values of the K sub-bands, and may determine a ratio of the total energy of the M sub-bands to the total energy of the K sub-bands as the first parameter.

Optionally, as another embodiment, the determining unit 320 may determine total energy of the M sub-bands and energy of a first sub-band according to the original envelope values of the M sub-bands, where the energy of the first sub-band is the largest in that of the M sub-bands. The determining unit 320 may determine a ratio of the energy of the first sub-band to the total energy of the M sub-bands as the second parameter.

Optionally, as another embodiment, the modification unit 330 may determine total energy of the M sub-bands and energy of a first sub-band according to the original envelope values of the M sub-bands, where the energy of the first sub-band is the largest in that of the M sub-bands. The modification unit 330 may determine a modification factor according to the total energy of the M sub-bands and the energy of the first sub-band, and may perform modification separately on the original envelope values of the M sub-bands using the modification factor to obtain the modified envelope values of the M sub-bands.

Optionally, as another embodiment, a modified envelope value of each sub-band in the M sub-bands may be greater than an original envelope value of the same sub-band.

Optionally, as another embodiment, the determining unit 320 may further determine a quantity of redundant bits of each sub-band in the N sub-bands according to quantities of bits respectively allocated to the N sub-bands during the first bit allocation. The quantity of redundant bits of each sub-band in the N sub-bands is less than a quantity of bits required for encoding a single information unit in the same sub-band. The determining unit 320 may further determine a total quantity of redundant bits according to the quantity of redundant bits of each sub-band in the N sub-bands. The allocation unit 340 may further perform second bit allocation on the N sub-bands according to the modified envelope values of the M sub-bands, the original envelope values of the K sub-bands, and the total quantity of redundant bits.

For other functions and operations of the device 300, reference may be made to the processes of the method embodiments in FIG. 1 and FIG. 2. To avoid repetition, details are not described herein again.

Figure 4:
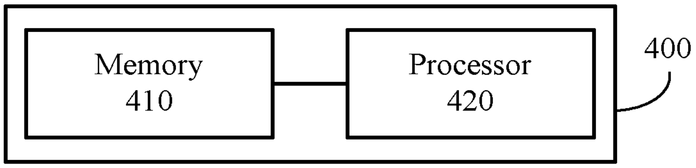
FIG. 4 is a simplified block diagram of a signal processing device according to another embodiment of the present disclosure.

FIG. 4 is a schematic block diagram of a signal processing device according to another embodiment of the present disclosure. A device 400 in FIG. 4 may be an encoder side device or a decoder side device. The device 400 in FIG. 4 includes a memory 410 and a processor 420.

The memory 410 may include a random access memory, a flash memory, a read-only memory, a programmable read-only memory, a non-volatile memory, a register, or the like. The processor 420 may be a central processing unit (CPU).

The memory 410 is configured to store an executable instruction. The processor 420 may execute the executable instruction stored in the memory 410 to select M sub-bands from N sub-bands, where the N sub-bands are obtained by dividing spectral coefficients of a current frame of a signal, a frequency band of the M sub-bands is lower than a frequency band of K sub-bands in the N sub-bands except the M sub-bands, N is a positive integer greater than 1, both M and K are positive integers, and the sum of M and K is N, determine, according to performance information of the M sub-bands, to modify original envelope values of the M sub-bands, where the performance information is used to indicate an energy attribute and a spectral attribute of the M sub-bands, perform modification separately on the original envelope values of the M sub-bands to obtain modified envelope values of the M sub-bands, and perform first bit allocation on the N sub-bands according to the modified envelope values of the M sub-bands and original envelope values of the K sub-bands.

In this embodiment of the present disclosure, bit allocation is not directly performed according to original envelope values of N sub-bands. Instead, M sub-bands of a low frequency band are selected from the N sub-bands, it is determined, according to an energy attribute and a spectral attribute of the M sub-bands, to modify original envelope values of the M sub-bands, modification is performed separately on the original envelope values of the M sub-bands according to the original envelope values of the M sub-bands, and first bit allocation is performed on the N sub-bands according to modified envelope values of the M sub-bands and original envelope values of K sub-bands such that bit allocation better meets a bit requirement of each sub-band, and therefore, signal encoding and decoding performance can be improved.

Optionally, as an embodiment, the processor 420 may determine a first parameter according to original envelope values of the N sub-bands, where the first parameter indicates a concentration degree that is of spectral energy of the signal and that is on the M sub-bands. The processor 420 may determine a second parameter according to the original envelope values of the M sub-bands, where the second parameter indicates a degree of spectral fluctuation of the M sub-bands. The processor 420 may determine, if the first parameter falls within a first range and the second parameter falls within a second range, to modify the original envelope values of the M sub-bands.

Optionally, as another embodiment, the processor 420 may determine total energy of the M sub-bands according to the original envelope values of the M sub-bands. The processor 420 may determine total energy of the K sub-bands according to the original envelope values of the K sub-bands, and may determine a ratio of the total energy of the M sub-bands to the total energy of the K sub-bands as the first parameter.

Optionally, as another embodiment, the processor 420 may determine total energy of the M sub-bands and energy of a first sub-band according to the original envelope values of the M sub-bands, where the energy of the first sub-band is the largest in that of the M sub-bands. The processor 420 may determine a ratio of the energy of the first sub-band to the total energy of the M sub-bands as the second parameter.

Optionally, as another embodiment, the processor 420 may determine total energy of the M sub-bands and energy of a first sub-band according to the original envelope values of the M sub-bands, where the energy of the first sub-band is the largest in that of the M sub-bands. The processor 420 may determine a modification factor according to the total energy of the M sub-bands and the energy of the first sub-band, and may perform modification separately on the original envelope values of the M sub-bands using the modification factor to obtain the modified envelope values of the M sub-bands.

Optionally, as another embodiment, a modified envelope value of each sub-band in the M sub-bands may be greater than an original envelope value of the same sub-band.

Optionally, as another embodiment, the processor 420 may further determine a quantity of redundant bits of each sub-band in the N sub-bands according to quantities of bits respectively allocated to the N sub-bands during the first bit allocation The quantity of redundant bits of each sub-band in the N sub-bands is less than a quantity of bits required for encoding a single information unit in the same sub-band. The processor 420 may further determine a total quantity of redundant bits according to the quantity of redundant bits of each sub-band in the N sub-bands. The processor 420 may further perform second bit allocation on the N sub-bands according to the modified envelope values of the M sub-bands, the original envelope values of the K sub-bands, and the total quantity of redundant bits.

For other functions and operations of the device 400, reference may be made to the processes of the method embodiments in FIG. 1 and FIG. 2. To avoid repetition, details are not described herein again.

Persons of ordinary skill in the art may be aware that, in combination wi$^{th}$ the examples described in the embodiments disclosed in this specification, units and algorithm steps may be implemented by electronic hardware or a combination of computer software and electronic hardware. Persons skilled in the art may use different methods to implement the described functions for each particular application, but it should not be considered that the implementation goes beyond the scope of the present disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. The foregoing storage medium includes any medium that can store program encode, such as a Universal Serial Bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. An audio signal or a speech signal processing method, comprising: obtaining spectral coefficients of a current frame of an audio or a speech signal, wherein a first frequency band of M sub-bands in N sub-bands of the spectral coefficients is lower than a second frequency band of K sub-bands in the N sub-bands except the M sub-bands, wherein N is an integer greater than 1, wherein M and K are positive integers, and wherein a sum of M and K is N;

determining a ratio of a first total energy of the M sub-bands to a second total energy of the K sub-bands as an energy characteristic of the M sub-bands;

obtaining a modification operation on first quantized envelope values of the M sub-bands when the energy characteristic falls within a first range and a spectral characteristic of the M sub-bands falls within a second range, wherein the spectral characteristic indicates a degree of spectral fluctuation of the M sub-bands and is based on the first quantized envelope values;

performing modification on the first quantized envelope values according to a modification factor to acquire modified envelope values of the M sub-bands, wherein the modification factor is based on the first total energy of the M sub-bands and a third energy of a first sub-band that is a largest energy among the M sub-bands; and performing a first bit allocation on the N sub-bands according to the modified envelope values and second quantized envelope values of the K sub-bands.

2. The signal processing method of claim 1, wherein the first range is [1/6, 2/3].

3. The signal processing method of claim 1, wherein the second range is $$\left[\frac{1}{0.575*M}, \infty\right)$$

or $$\left[\frac{1}{0.5*M}, \infty\right).$$

4. The signal processing method of claim 1, wherein performing the modification on the first quantized envelope values comprises:

determining the first total energy and the third energy of the first sub-band in the M sub-bands according to the first quantized envelope values;

determining the modification factor according to the first total energy and the third energy; and performing the modification on the first quantized envelope values using the modification factor to acquire the modified envelope values.

5. The signal processing method of claim 4, wherein the third energy is based on a bandwidth of the first sub-band and a third quantized envelope value of the first sub-band, and wherein the third quantized envelope value is one of the first quantized envelope values.

6. The signal processing method of claim 1, wherein second modified envelope value of each of the M sub-bands is greater than a corresponding envelope value of the first quantized envelope values.

7. The signal processing method of claim 1, further comprising:

determining a first quantity of redundant bits of each of the N sub-bands according to quantities of bits respectively allocated to the N sub-bands during the first bit allocation, wherein the first quantity of redundant bits is less than a second quantity of bits for encoding a single information unit in a corresponding sub-band of the N sub-bands;

determining a total quantity of redundant bits according to the first quantity of redundant bits; and performing a second bit allocation on the N sub-bands according to the modified envelope values, original envelope values of the K sub-bands, and the total quantity of redundant bits.

8. An audio signal or a speech signal processing device:

a memory configured to store instructions; and a processor coupled to the memory and configured to execute the instructions to cause the signal processing device to:

obtain spectral coefficients of a current frame of an audio or a speech signal, wherein a first frequency band of M sub-bands in N sub-bands of the spectral coefficients is lower than a second frequency band of K sub-bands in the N sub-bands except the M sub-bands, wherein N is an integer greater than 1, wherein M and K are positive integers, and wherein a sum of M and K is N;

determine a ratio of a first total energy of the M sub-bands to a second total energy of the K sub-bands as an energy characteristic of the M sub-bands;

determine a modification operation on first quantized envelope values of the M sub-bands when the energy characteristic falls within a first range and a spectral characteristic of the M sub-bands falls within a second range, wherein the spectral characteristic indicates a degree of spectral fluctuation of the M sub-bands and is based on the first quantized envelope values;

perform modification on the first quantized envelope values according to a modification factor to acquire modified envelope values of the M sub-bands, wherein the modification factor is based on the first total energy of the M sub-bands and a third energy of a first sub-band that is a largest energy among the M sub-bands; and perform a first bit allocation on the N sub-bands according to the modified envelope values and second quantized envelope values of the K sub-bands.

9. The signal processing device of claim 8, wherein the first range is [1/6, 2/3].

10. The signal processing device of claim 8, wherein the second range is $$\left[\frac{1}{0.575*M}, \infty\right)$$

or $$\left[\frac{1}{0.5*M}, \infty\right).$$

11. The signal processing device of claim 8, wherein the processor is further configured to execute the instructions to cause the signal processing device to perform the modification on the first quantized envelope values by:

determining the first total energy and the third energy of the first sub-band in the M sub-bands according to the first quantized envelope values;

determining the modification factor according to the first total energy and the third energy; and performing the modification on the first quantized envelope values using the modification factor to acquire the modified envelope values.

12. The signal processing device of claim 11, wherein the third energy is based on a bandwidth of the first sub-band and a third quantized envelope value of the first sub-band, wherein the third quantized envelope value is one of the first quantized envelope values.

13. The signal processing device of claim 8, wherein second modified envelope value of each of the M sub-bands is greater than a corresponding envelope value of the first quantized envelope values.

14. The signal processing device of claim 8, wherein the processor is further configured to execute the instructions to cause the signal processing device to:

determine a first quantity of redundant bits of each of the N sub-bands according to quantities of bits respectively allocated to the N sub-bands during the first bit allocation, wherein the first quantity of redundant bits is less than a second quantity of bits for encoding a single information unit in a corresponding sub-band of the N sub-bands;

determine a total quantity of redundant bits according to the first quantity of redundant bits; and perform a second bit allocation on the N sub-bands according to the modified envelope values, original envelope values of the K sub-bands, and the total quantity of redundant bits.

15. A computer program product comprising instructions that are stored on a non-transitory computer-readable medium and that when executed by a processor, causes An audio signal or a speech signal processing device to:

obtain spectral coefficients of a current frame of an audio or a speech signal, wherein a first frequency band of M sub-bands in N sub-bands of the spectral coefficients is lower than a second frequency band of K sub-bands in the N sub-bands except the M sub-bands, wherein N is an integer greater than 1, wherein M and K are positive integers, and wherein a sum of M and K is N;

determine a ratio of a first total energy of the M sub-bands to a second total energy of the K sub-bands as an energy characteristic of the M sub-bands;

obtain a modification operation on first quantized envelope values of the M sub-bands when the energy characteristic falls within a first range and a spectral characteristic of the M sub-bands falls within a second range, wherein the spectral characteristic indicates a degree of spectral fluctuation of the M sub-bands and is based on the first quantized envelope values;

perform modification on the first quantized envelope values according to a modification factor to acquire modified envelope values of the M sub-bands, wherein the modification factor is based on the first total energy of the M sub-bands and a third energy of a first sub-band that is a largest energy among the M sub-bands; and perform a first bit allocation on the N sub-bands according to the modified envelope values and second quantized envelope values of the K sub-bands.

16. The computer program product of claim 15, wherein the first range is [1/6, 2/3].

17. The computer program product of claim 15, wherein the second range is $$\left[\frac{1}{0.575*M}, \infty\right)$$

or $$\left[\frac{1}{0.5*M},\infty\right).$$

18. The computer program product of claim 15, wherein the processor is further configured to execute the instructions to cause the signal processing device to:

determine the first total energy and the third energy of the first sub-band in the M sub-bands according to the first quantized envelope values, wherein the third energy is largest among the M sub-bands;

determine the modification factor according to the first total energy and the third energy; and perform the modification on the first quantized envelope values using the modification factor to acquire the modified envelope values.

19. The computer program product of claim 18, wherein the third energy is based on a bandwidth of the first sub-band and a third quantized envelope value of the first sub-band, wherein the third quantized envelope value is one of the first quantized envelope values.

20. The computer program product of claim 15, wherein second modified envelope value of each of the M sub-bands is greater than a corresponding envelope value of the first quantized envelope values.

* * * * *